(12) United States Patent
Sawada

(10) Patent No.: US 6,198,495 B1
(45) Date of Patent: Mar. 6, 2001

(54) COLOR IMAGE FORMING APPARATUS HAVING MEANS FOR CORRECTING DEVIATIONS BETWEEN SCANNING LIGHT BEAMS ACCURATELY AND IN REAL TIME

(75) Inventor: Kouichi Sawada, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 08/863,814

(22) Filed: May 27, 1997

(30) Foreign Application Priority Data

May 29, 1996 (JP) ................................. 8-135006

(51) Int. Cl.$^7$ .................................................. B41J 2/455
(52) U.S. Cl. ..................... 347/233; 347/116; 347/232; 347/234; 347/248
(58) Field of Search .................... 347/115, 116, 347/232, 233, 234, 248, 235, 249; 358/475; 399/42, 44

(56) References Cited

U.S. PATENT DOCUMENTS

| | | | |
|---|---|---|---|
| 4,423,426 | * 12/1983 | Kitamura | 347/235 |
| 5,291,223 | * 3/1994 | Ogane et al. | 347/116 |
| 5,294,959 | * 3/1994 | Nagao et al. | 399/44 |
| 5,379,059 | * 1/1995 | Winsor | 347/257 |
| 5,384,592 | * 1/1995 | Wong | 347/116 |
| 5,450,120 | * 9/1995 | Nishio | 347/249 |
| 5,543,829 | * 8/1996 | Fisli | 347/257 |
| 5,576,852 | * 11/1996 | Sawada et al. | 358/475 |

FOREIGN PATENT DOCUMENTS

| | | |
|---|---|---|
| 0588551 A1 | 3/1994 | (EP) . |
| 0620671 A1 | 10/1994 | (EP) . |
| 0709707 A2 | 5/1996 | (EP) . |
| 54-158251 | 12/1979 | (JP) . |
| 58-68016 | 4/1983 | (JP) . |
| 62-86324 | 4/1987 | (JP) . |
| 63-50809 | 3/1988 | (JP) . |
| 6-270463 | 9/1994 | (JP) . |
| 7-228000 | 8/1995 | (JP) . |
| 7-248458 | 9/1995 | (JP) . |

\* cited by examiner

*Primary Examiner*—N. Le
*Assistant Examiner*—Hai C. Pham
(74) *Attorney, Agent, or Firm*—Frishauf, Holtz, Goodman, Langer & Chick, P.C.

(57) ABSTRACT

An image forming apparatus includes an image carrier, a laser diode for generating a plurality of light beams, and a rotating polygonal mirror for simultaneously scanning the image carrier in a primary scanning direction along respective lines which are parallel to each other in a secondary scanning direction. The image carrier is scanned once for each of a plurality of different colors to thereby form a color image on the image carrier. A photosensitive sensor is provided for detecting an amount of deviation of the plurality of light beams in the primary scanning direction with respect to a first color of the plurality of different colors, and deviations among the plurality of light beams in connection with scanning for each of the plurality of different colors are corrected according to the detected amount of deviation with respect to the first color of the plurality of different colors.

4 Claims, 14 Drawing Sheets

FIG. 7 (B) OUTPUT OF SENSOR A
FIG. 7 (C) OUTPUT OF SENSOR D

FIG. 7 (E) OUTPUT OF SENSOR A
FIG. 7 (F) OUTPUT OF SENSOR D
FIG. 7 (G) DELAYED SIGNAL OF OUTPUT OF SENSOR A

COLOR IMAGE FORMING APPARATUS HAVING MEANS FOR CORRECTING DEVIATIONS BETWEEN SCANNING LIGHT BEAMS ACCURATELY AND IN REAL TIME

BACKGROUND OF THE INVENTION

The present invention relates to a technique for finely adjusting an amount of deviation of scanning positions of a plurality of light beams in a primary scanning direction in an image forming apparatus such as a laser printer, or a similar apparatus in which a plurality of light beams simultaneously scan a recording medium parallel to the primary scanning direction so that plural lines are simultaneously recorded.

In order to attain high speed scanning in a conventional optical system to conduct laser beam scanning, it is necessary to increase a rotation speed of a polygonal mirror or the like, and therefore a highly accurate production engineering for air bearings, or the like, is essential. Accordingly there is problem of a high production cost.

On the other hand, as disclosed in Japanese Patent Publication Open to Public Inspection No. 158251/1979, a scanning method is widely known in which a plurality of light emitting portions of semiconductor lasers are used, and scanning is simultaneously conducted using a plurality of scanning lines. However, in order to control pitches of scanning lines, it is required to accurately adjust an interval distance between light emitting portions, and to accurately arrange them. Further, it is required to accurately conduct the angular control of the light emitting portions in the arrangement direction, and therefore, a highly accurate adjusting mechanism is essential.

Furthermore, in a scanning optical system disclosed in Japanese Patent Publication Open to Public Inspection No. 68016/1983, the pitch of scanning line in the subsidiary scanning direction is adjustable, and in an optical writing apparatus disclosed in Japanese Patent Publication Open to Public Inspection No. 50809/1988, a scanning optical path in the subsidiary scanning direction is adjusted by using 2 adjustment screws.

Further, an optical system disclosed in Japanese Patent Publication Open to Public Inspection No. 86324/1987 relates to a 2 beam laser printer in which the position adjustment of the collimator unit itself is carried out.

An apparatus to detect deviations of scanning positions of 2 light beams in the subsidiary scanning direction in an image forming apparatus is disclosed in Japanese Patent Publication Open to Public Inspection No. 228000/1995. Japanese Patent Publication Open to Public Inspection No. 248458/1995, moreover, discloses a technique in which an amount of deviation of scanning positions among a plurality of light beams is detected, and image recording is corrected according to the detected amount of deviation.

However, in all of the above technologies, in cases where the optical scanning apparatus is structured such that a plurality of lines are simultaneously recorded using plural sets of laser beams, in a plural-beam optical scanning apparatus in which laser beams (light beams) modulated according to image data are reflected by a rotating polygonal mirror and scan the recording medium so that image information is recorded, scanning positions of a plurality of laser beams are adjusted so as to conform to predetermined positions. However, these scanning positions fluctuate due to environmental change, and therefore, there is a problem in that accurate image formation can not stably be performed.

Accordingly, while the environmental change is being observed, when it goes over a predetermined range, a countermeasure in which fine adjustment is conducted again, is taken. Generally, a recording system which conducts scanning using laser beams is easily influenced by a temperature variation. Accordingly, a temperature sensor to detect temperature is provided, and a voltage outputted from the sensor corresponding to the temperature is A/D-converted by an A/D-converter and is outputted to a CPU. In the CPU, a temperature variation is determined by comparing newest inputted temperature data to the temperature at the last fine adjustment time, and when, for example, the temperature variation more than ±10° C. is detected, the fine adjustment is conducted again. By this fine adjustment, the scanning positions of the plurality of laser beams are set within a predetermined value.

FIG. 15 is a flow chart showing a process in which adjustment of deviation is conducted by the temperature measurement. The CPU conducts temperature measurement and calculation by an output signal from a temperature sensor, not shown in the drawing, and the A/D converter, and calculates a temperature variation by comparing the newest measurement data to the preceding measurement data. It is then determined whether the temperature difference due to the detected temperature variation is within the predetermined value. When it is within the predetermined value, the temperature measurement by the temperature sensor is again conducted. However, when the temperature variation is more than the predetermined value, fine adjustment is executed, and then temperature measurement is conducted.

However, in the above fine adjustment, it can not be judged whether the temperature variation completely coincides with the amount of deviation, and the fine adjustment may therefore not be accurate. Furthermore, there is a problem in that a time lag is generated between the temperature variation and the deviation, so that it is difficult to detect the amount of deviation in real time.

On the other hand, it is disclosed in Japanese Patent Open to Public Inspection No. 270463/1994 that a plurality of optical sensors are arranged to detect the deviation of 2 beams in the primary scanning direction accurately and in real time. However, the technique disclosed in this publication relates only monochromatic image formation, and nothing is disclosed with respect to how to control the deviation of the beams in order to superimpose a plurality of colors in the color image formation. For example, when 3 color toner images are superimposed on a photoreceptor drum, it is necessary to repeat image exposure and development for each color. That is, in order to complete the color image formation, it is necessary to conduct image exposure 3 times. In this case, when correction control of the deviation of beams is conducted for each image exposure, there is a possibility that a result of calculation of an amount of deviation is different for each color, so that color doubling occurs when, finally, each color image is superimposed.

SUMMARY OF THE INVENTION

Accordingly, an object of the present invention is to solve the above problems and to correct deviation between beams accurately and in real time, and to prevent doubling in color images.

In order to attain the above object, an image forming apparatus of the present invention has the following structure. The image forming apparatus has an image carrier; a plurality of light beam exposure means by which a plurality of light beams are generated, and a latent image is formed on the image carrier for every plurality of lines by simultaneously scanning the image carrier parallel in the same direction, wherein exposure by the light beam exposure means is repeated plural times for each color so that a color image for 1 page is formed on the image carrier; a photosensitive sensor to detect an amount of deviation of the plurality of light beams in the scanning direction; and a deviation correction means to correct deviations among the plurality of light beams corresponding to the detected amount of deviation, wherein the deviation correction means detects an amount of deviation among light beams and corrects the deviation before the first color exposure, and for the second color exposure and after, the correction of deviation is conducted according to the correction conducted for the first color exposure.

As described above, in the present invention, in the case of the structure in which a plurality of lines are simultaneously recorded using plural sets of laser beams, in an image forming apparatus provided with a plural beam optical scanning apparatus in which plural sets of laser beams (light beams), modulated according to image data, are reflected by a rotating polygonal mirror or a similar device, and scan on the recording medium so as to record image information, an operation to finely adjust a scanning position of the plural sets of laser beams within a predetermined value, is carried out by a control circuit, by which the operation is conducted before image formation according to a page area signal to show an image formation area.

Accordingly, an image forming apparatus can be realized in which an environmental temperature observing mechanism is not necessary, a CPU load for calculation is not increased, dot pitches in the primary scanning direction can be adjusted, and high speed image formation can be attained.

DETAILED DESCRIPTION OF THE PREFERRED EMBODIMENT

Prior to an explanation of an example of the present invention, the structure and opera-ions of a color printer, which is an example of an image forming apparatus of the present invention, will be described referring to a sectional view of the structure of FIG. 1.

This color printer is a color image forming apparatus of a type in which each color toner image, successively formed on an image carrier, is superimposed on each other, transferred once onto a recording sheet in a transfer section and a color image is formed, and then the recording sheet is separated from the surface of the image carrier by a separation means.

Figure 1:
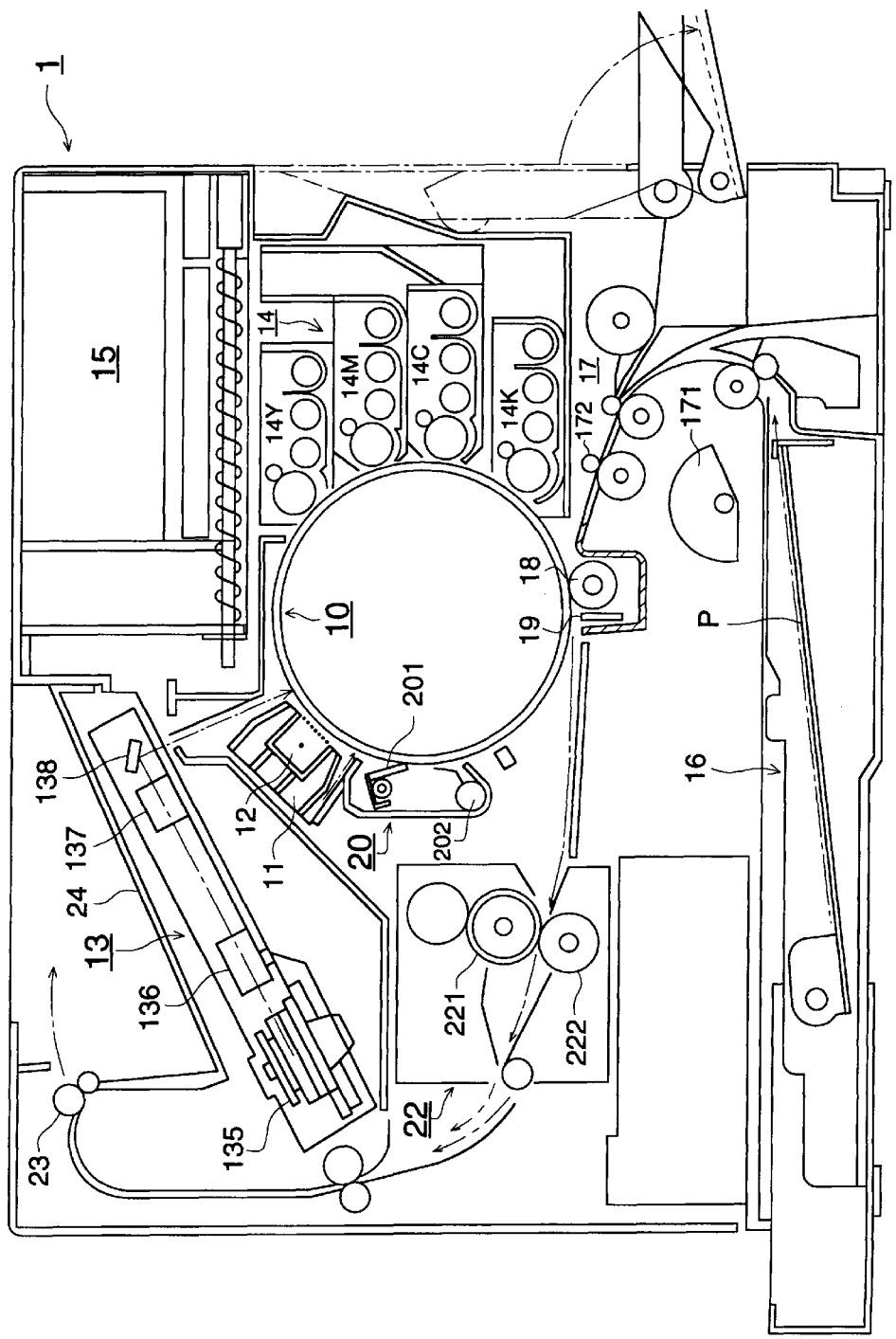
FIG. 1. is a sectional structural view of a color printer as an example of an image forming apparatus of the present invention.

In FIG. 1, numeral 10 is a photoreceptor drum serving as an image carrier (recording medium), which is structured by coating an OPC photoreceptor (organic photoreceptor) on a drum base body, and is electrically grounded and rotated clockwise as shown in the drawing. Numeral 12 is a scorotron charger, by which the peripheral surface of the photoreceptor drum 10 is uniformly charged with a high voltage $V_H$ by a corona discharge, generated by a grid with a grid potential voltage $V_G$ and a corona discharging wire. Prior to charging by the scorotron charger 12, the peripheral surface of the photoreceptor is discharged by exposure by a PCL (pre-charging discharger) 11 using a light emitting diode or the like, in order to eliminate the hysteresis of the photoreceptor until the preceding printing.

After uniform charging onto the photoreceptor drum 10, image exposure according to digital image data is conducted by an image exposure means 13. The image exposure means 13 conducts primary scanning as follows: a laser diode is used as a light emitting source, and the optical path of the laser beams is reflected by a reflection mirror 138 through a rotating polygonal mirror 135, an fθ lens 136, and a cylindrical lens 137. A latent image is formed by a rotation of the photoreceptor drum 10 (subsidiary scanning). In the present example, exposure is conducted on a character portion, and a reversal latent image is formed such that the character portion has low potential voltage $V_L$.

Developing devices 14 (14Y, 14M, 14C, 14K) in which developer composed of toner, such as yellow (Y), magenta (M), cyan (C) or black (K), and carrier is respectively accommodated, are provided around the photoreceptor drum 10. Initially, development of the first color of yellow is conducted by a developing sleeve which houses a magnet and is rotated holding the developer thereon. The developer is composed of carrier, in which ferrite is used as a core, and insulating resin is coated around the core; and toner in which polyester is used as primary material, and pigments corresponding to colors, charge control agents, silica, and titan oxide are added. The layer thickness of developer is regulated to 100 through 600 μm on the developing sleeve by a layer forming means, and the developer is conveyed to a developing area.

A gap between the developing sleeve and photoreceptor drum 10 in the developing area is 0.2 though 1.0 mm which is larger then the layer thickness of developer, and an AC bias voltage $V_{AC}$ and a DC bias voltage $V_{DC}$ are applied on the gap, by being superimposed on each other. $V_{DC}$, $V_H$ and charged toner have the same polarity, and therefore, toner triggered to separate from the carrier by $V_{AC}$ does not adhere to a $V_H$ portion, the potential of which is higher than $V_{DC}$, but adheres to a $V_L$ portion, the potential of which is lower than $V_{DC}$, and visualization (reversal development) is carried out.

After the visualization of the first color has been completed, the system enters into an image formation process of the second color of magenta, uniform charging is carried out again by the scorotron charger 12, and a latent image is formed by the image exposure means 13 according to second color image data. In this case, discharge by the PCL 11, conducted in the first color image formation process, is not conducted because toner adhered to the first color image portion is scattered by a rapid lowering of the potential voltage around the image portion.

In the photoreceptor, having again the potential voltage of $V_H$ on the entire peripheral surface of the photoreceptor drum 10, the same latent image as the first color is formed on a portion, on which the first color image does not exist, and development is conducted. However, in a portion in which development is carried out again on a portion on which the first color image exists, a latent image having the potential voltage of $V_M'$ is formed by light shading by the adhered first color toner, and by electric charges of toner itself, and development is conducted corresponding to the potential difference between $V_{DC}$ and $V_M'$. When the first color development is conducted on the latent image having the potential voltage of $V_L$ on the superimposed portion of the first color and second color images, a balance of the first color and second color images is lost, and therefore, sometimes the exposure amount of the first color is decreased and an intermediate potential voltage having the relationship $V_H > V_M > V_L$ is used.

Relating also to the third color of cyan and the fourth color of black, the same image formation process as the second color of magenta is carried out and then, a four color visual image is formed on the peripheral surface of the photoreceptor drum 10.

Numeral 15 is a toner replenishing device to replenish new toner for each color to the developing devices 14Y, 14M, 14C and 14K.

On the other hand, a sheet of transfer material (transfer sheet) P, conveyed from a sheet feed cassette 16 through a semicircular roller 171, temporarily stops, and is sent to a transfer area by the rotation of a pair of register rollers 172 in timed relationship with transfer timing.

In the transfer area, a transfer means 18 is pressure-contacted with the peripheral surface of the photoreceptor drum 10 in timed relationship with transfer timing, the fed transfer material P is nipped between the transfer means and the peripheral surface of the photoreceptor drum 10, and a multi-color image is collectively transferred onto the transfer material P.

Next, the transfer material P is discharged by a separation means 19, and is separated from the peripheral surface of the photoreceptor drum 10 and conveyed to a fixing device 22, toner is fused on the transfer material P by heat and pressure of a heat roller (upper roller) 221 and a pressure roller (lower roller) 222, and the transfer material P is delivered onto a delivery tray 24 provided outside the apparatus through a discharging roller 23. In this connection, the transfer means 18 is withdrawn from the peripheral surface of the photoreceptor drum 10 after the passage of the transfer material P, and is ready for the next toner image formation.

On the other hand, the photoreceptor drum 10, from which the transfer material P is separated, is in pressure-contact with a blade 201 of a cleaning device 20, and residual toner on the photoreceptor drum 10 is removed, the photoreceptor drum is cleaned, discharged again by the PCL 11, charged by the charger 12, and enters the next page-image formation process. Incidentally, the blade 201 is moved at once and withdrawn from the peripheral surface of the photoreceptor drum 10 after the cleaning of the photoreceptor drum surface. The waste toner, scraped off into the cleaning device 20 by the blade 201, is delivered by a screw 202, and then stored in a waste toner collection container, not shown in the drawing.

Next, a plural beam optical scanning apparatus of the present invention will be described referring to a two beam optical scanning apparatus shown in FIG. 2.

Figure 2:
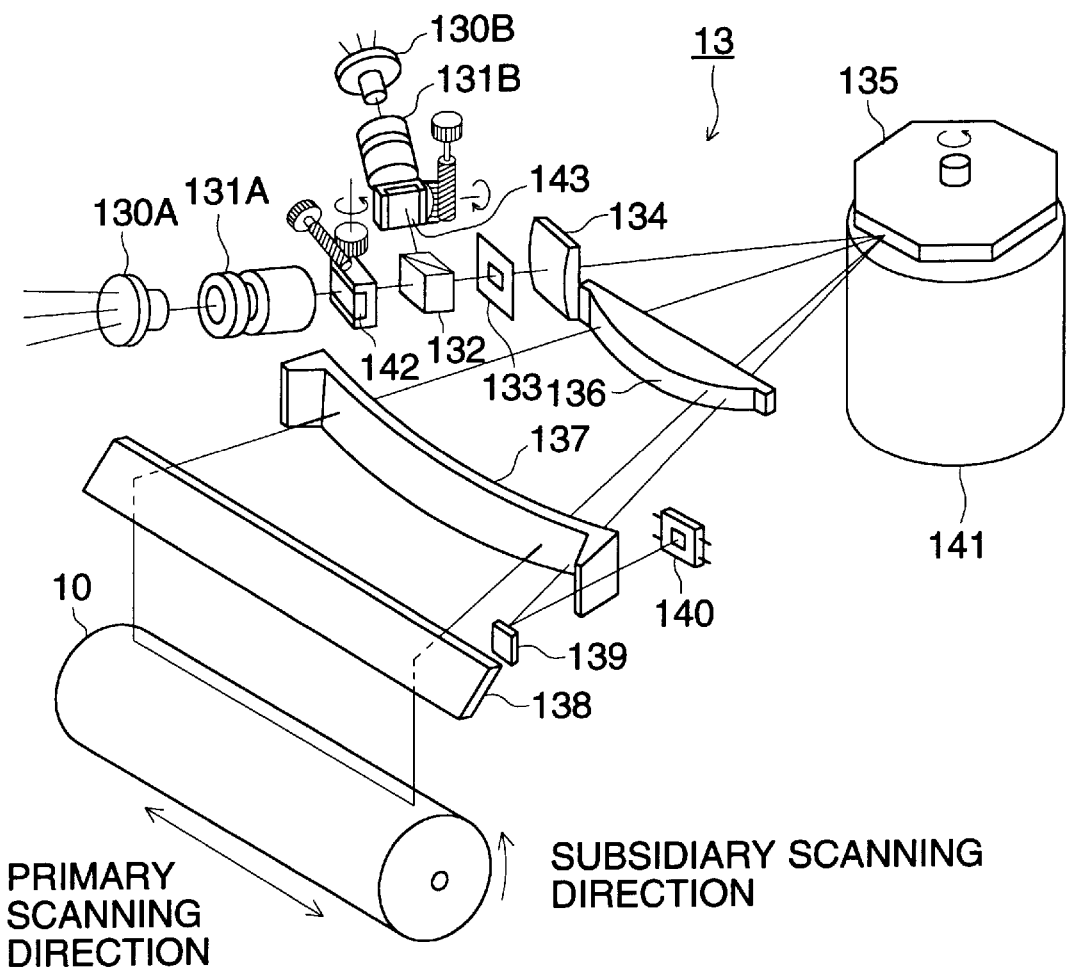
FIG. 2 is a overall structural view of a 2 beam optical scanning apparatus.

In FIG. 2, numerals 130A and 130B are semiconductor lasers, 131A and 131B are collimator lenses (beam shaping optical system), numeral 132 is a beam composition prism, numeral 133 is an aperture, numeral 134 is a first cylindrical lens, numeral 135 is a polygonal mirror, numeral 136 is an fθ lens, numeral 137 is a second cylindrical lens, numeral 138 is a mirror, and numeral 10 is the photoreceptor drum. Numeral 139 is a timing detection mirror, numeral 140 is an index sensor, and numeral 141 is a stepping motor for driving the polygonal mirror 135. Numeral 142 is a pair of prism set for primary scanning direction adjustment, and numeral 143 is a pair of prism set for subsidiary scanning direction pitch adjustment.

A light beam emitted from the semiconductor laser 130A is made to a parallel light by a collimator lens 131A, and enters the beam composition prism 132. A light beam emitted from the semiconductor laser 130B arranged perpendicular to the semiconductor laser 130A, is also made to a parallel light by the collimator lens 131B in the same manner as the above, and then, enters the beam composition prism 132. In this connection, the light beam, emitted from the semiconductor laser 130B is shifted by a predetermined pitch from the light beam emitted from the semiconductor laser 130A. Both light beams pass through the aperture 133 and enter the polygonal mirror 135 through the first cylindrical lens 134 of the first image formation optical system. The reflected light beams penetrate the second image formation optical system composed of the fθ lens 136 and the second cylindrical lens 137, and simultaneously scan two lines by a predetermined spot diameter, while being shifted by a predetermined pitch in the subsidiary scanning direction, on the peripheral surface of the photoreceptor drum 10, through the mirror 138. In this connection, the primary scanning direction is already finely adjusted by a adjustment mechanism, not shown in the drawing. Synchronization detection for each 1 line is carried out by guiding the light beam flux before the start of scanning, to the second image formation optical system through the mirror 138, and by making the light beam flux enter the index sensor 140.

Figure 3A:
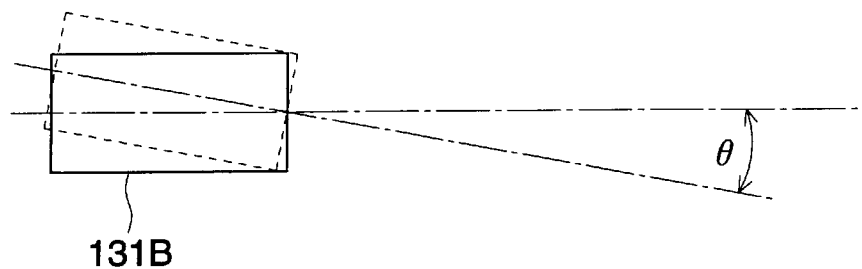
FIGS. 3(A) and 3(B) are illustrations to explain a beam angle adjustment of a set of prism-sets
Figure 3B:
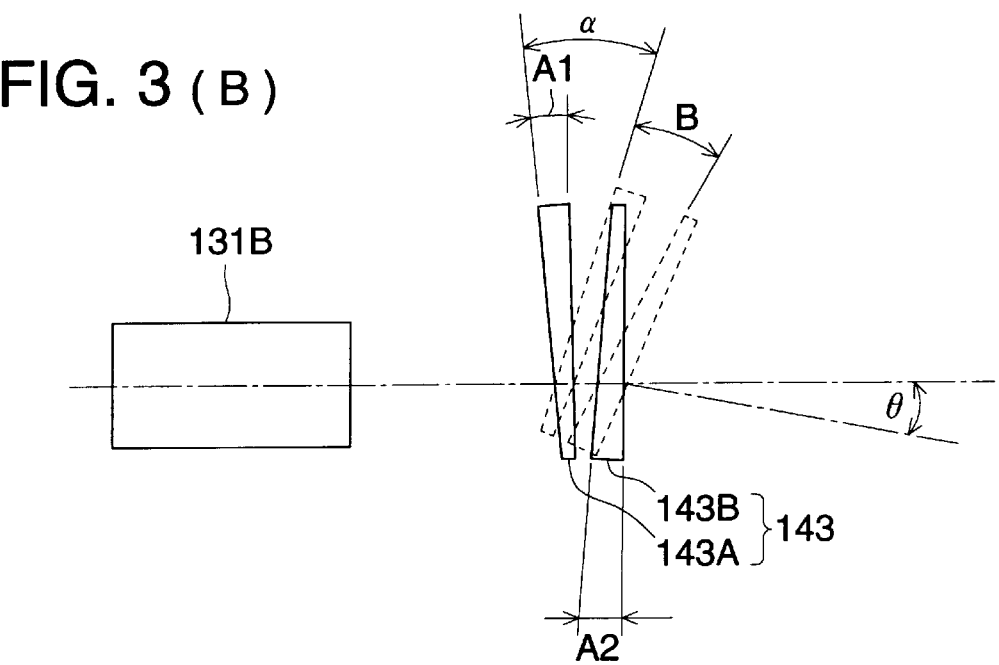

FIG. 3 is a view to explain an adjustment of beam angle of the pair of prism set 143. In a conventional method shown in FIG. 3(A), in order to obtain an angle of deflection of the optical path, the collimator lens 131B is directly deflected by an angle θ, and therefore, accurate angular adjustment of the collimator lens 131B is difficult. FIG. 3(B) shows a deflection method of the optical path of the present example, and accurate angular adjustment can be conducted. A pair of prism set composed of 2 prisms 143A and 143B, are arranged near the emitting portion of the collimator lens 131B, and the prism set 143 are rotated by an angle α, so that the optical path is deflected by a predetermined deflection angle θ.

Figure 4:
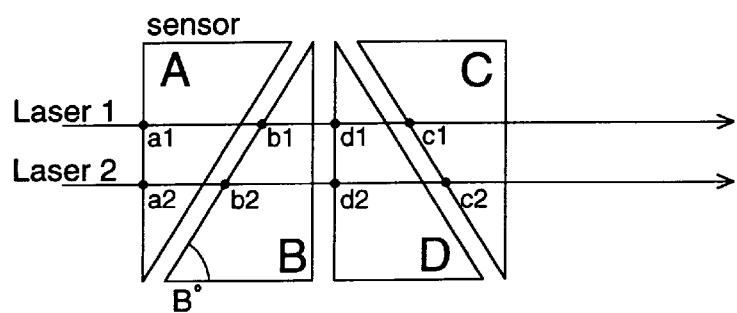
FIG. 4 is a view showing a detail of an index sensor.

Next, the present invention will be explained using FIG. 4 showing the detail of an index sensor.

The index sensor 140 is structured such that 4 sensors (light beam detection means) A–D, which respectively output a detection signal, are integrally provided, and sensor A–D are arranged in the primary scanning direction and laser beams L1 and L2 scan in the order of A→B→D→C.

A light beam detection area (light receiving area) of respective sensors A–D is formed of a right angled triangle. The sensor A is arranged such that a longer side of 2 sides which form a right angle, is a starting-line (on the start-side) in the primary scanning direction, and the longer side is perpendicular to the primary scanning direction (parallel to the subsidiary scanning direction). The sensor B is arranged such that the hypotenuse of a detection area which is a right angled triangle, is a starting-line (on the start-side) in the primary scanning direction, and the hypotenuse slantly intersects the primary scanning direction by an angle formed between the longer side and the hypotenuse. Further, when the subsidiary scanning direction is defined here as a vertical direction, the sensor D is arranged such that the arrangement condition of the sensor A is vertically reversed. Furthermore, the sensor C is arranged such that the detection area of sensor C is symmetrical with that of the sensor A with respect to an axis along the subsidiary scanning direction.

Incidentally, the sensors A and C shown in FIG. 4, are arranged such that the longer side of two sides forming the right angle is perpendicular to the primary scanning direction, however, they may be arranged such that the longer side is parallel to the primary scanning direction.

According to the arrangement of sensors A–D, the starting lines (on the start-side) of sensors A–D in the primary scanning direction are respectively parallel to the subsidiary scanning direction in cases of sensors A and D, and are not parallel in cases of sensors B and C, and further, the direction of inclination with respect to the primary scanning direction is reverse to each other.

Incidentally, in FIG. 4, the starting position of detection of the laser beam L1 by the sensor A (the position at which a beam detection signal rises) is shown as a1, and the starting position of the detection of the laser beam L2 is shown as a2. In the same manner, the starting positions of detection of laser beams L1 and L2 by the sensors B–D are respectively shown as b1, b2, c1, c2, d1 and d2.

Figure 5:
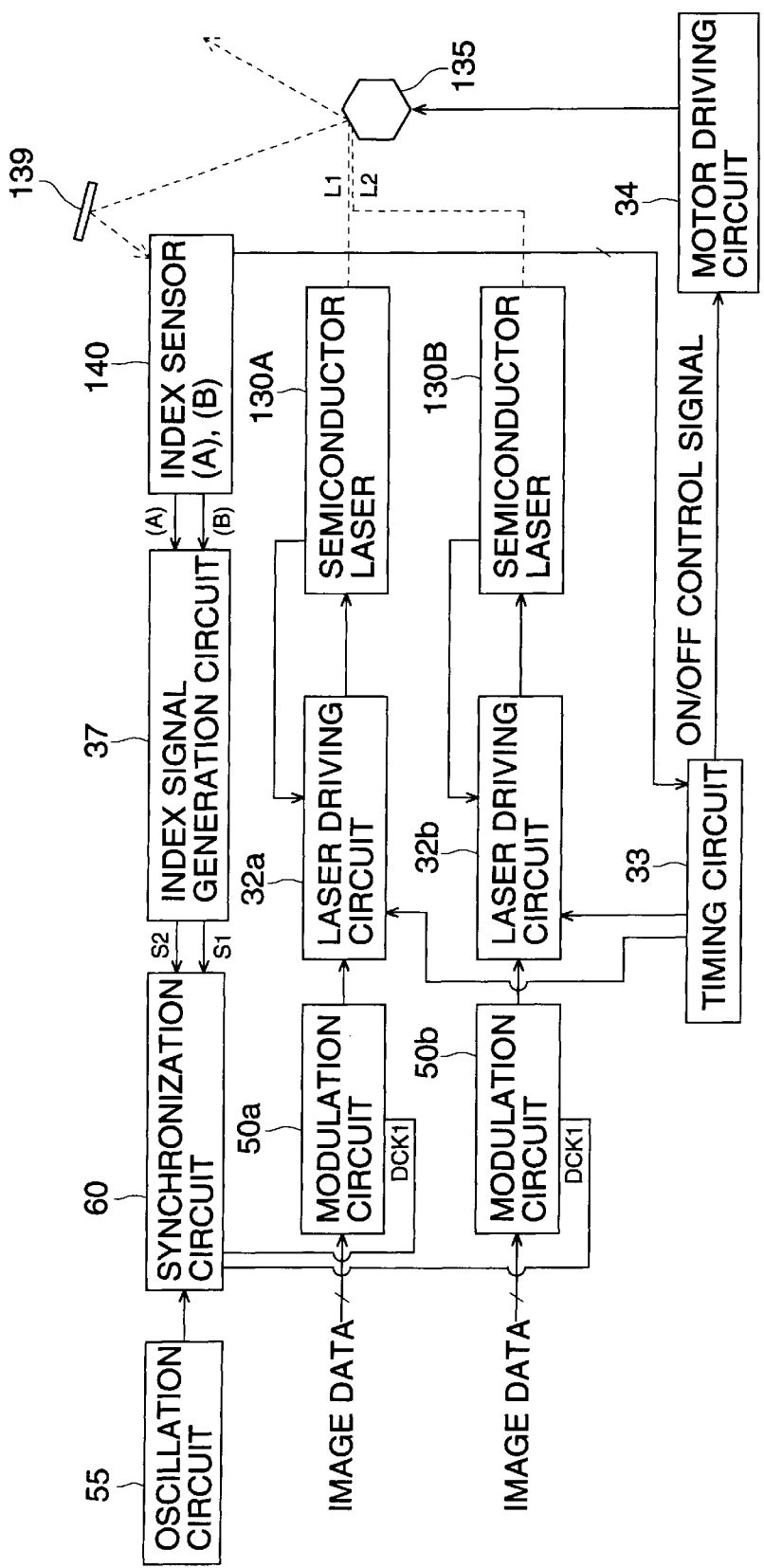
FIG. 5 is a block diagram showing a system structure of the color printer in FIG. 1.

FIG. 5 is a block diagram showing the system structure of the color printer of FIG. 1.

In FIG. 5, digital image data DATA of each line is respectively supplied to modulation circuits 50a and 50b, and signals, according to each image data DATA, data clocks DCK1 and DCK2, are formed in the modulation circuits 50a and 50b.

Signals from the modulation circuits 50a and 50b are respectively supplied to semiconductor lasers 130A and 130B through laser driving circuits 32a and 32b, and thereby image recording is conducted.

Laser driving circuits 32a and 32b are individually controlled by control signals from a timing circuit 33 so that they are driven only in horizontal and vertical effective sections. The timing circuit 33 has a function to selectively emit the laser beams L1 and L2 so that index signals S1 and S2 (synchronization signals), which will be described later, are generated.

Signals to show a light amount of the laser beam, are fed back from the semiconductor lasers 130A and 130B to the laser driving circuits 32a and 32b, and the drive of the semiconductor lasers 130A and 130B are controlled so that the amounts of light are constant.

Two laser beams L1 and L2 respectively outputted from the semiconductor lasers 130A and 130B, are supplied to the polygonal mirror 135 and deflected, and scan the photoreceptor (recording medium), not shown in the drawing. Starting points of scanning of the laser beams L1 and L2, deflected by the polygonal mirror 135, are detected by an index sensor (beam detection means) 140, provided on the leading edge side of the scanning area. The detection signal of the index sensor 140 is supplied to an index signal (synchronization signal) generation circuit 37, and index signals (synchronization signals) S1 and S2 to respectively control the start of recording by the laser beams L1 and L2 are formed by the index signal generation circuit 37.

Figure 6:
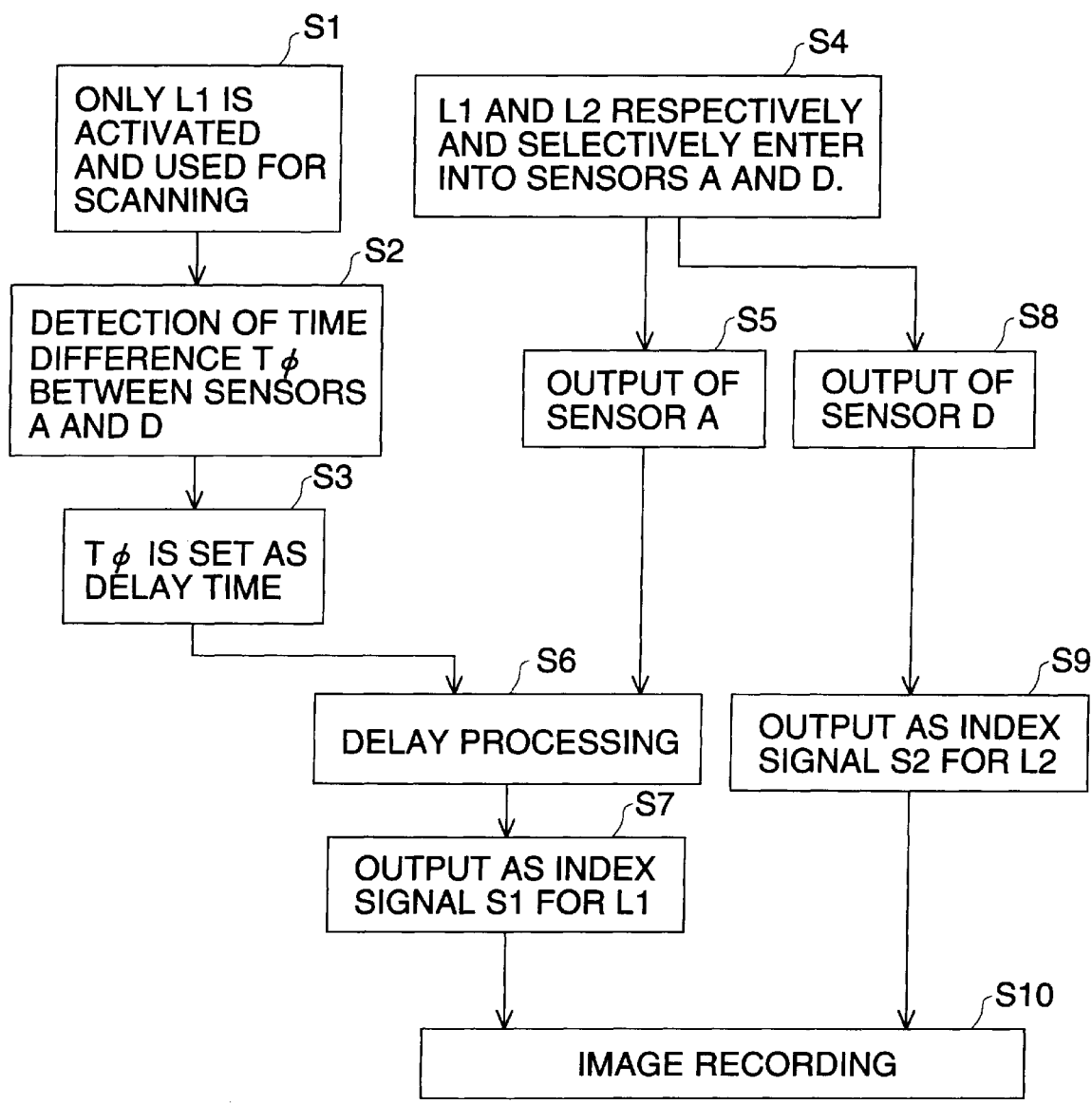
FIG. 6 is a flow chart showing the first example of synchronization signal generation control.

Here, referring to a time chart in FIG. 7, the generation control of the index signals S1 and S2 in the index signal generation circuit 37 will be described, according to steps shown in a flow chart in FIG. 6.

Initially, just before image formation of each page image when an monochrome image is formed, and just before image formation of the first color, obtained by color-separating each page image, when a color image is formed, only the laser beam L1 is emitted to scan the image in the same manner as in the ordinary image recording, and the laser beam L1 enters into respective sensor A and sensor D (2 beam detection means) of the index sensor 140 (S1).

Figure 7:
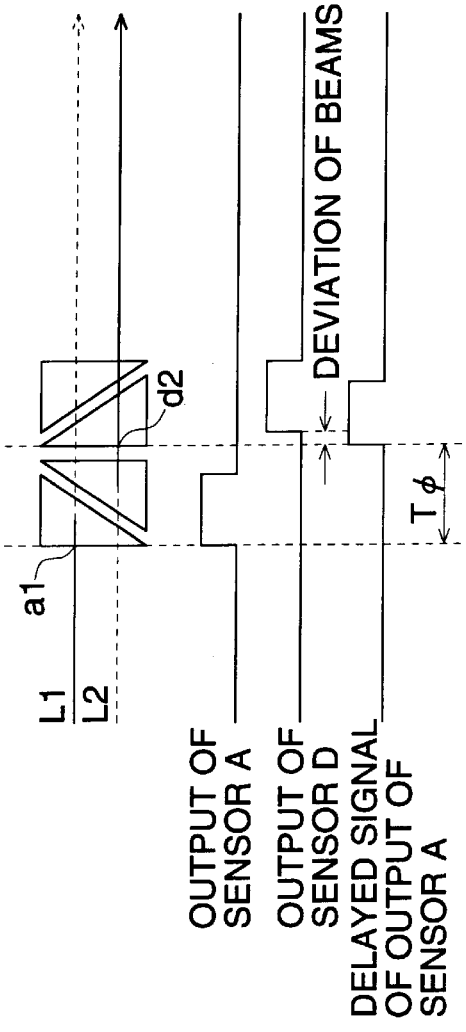
FIGS. 7(A) through 7(G) are time charts showing characteristics of synchronization signal generation in the first example.

Simultaneously, time $T_\phi$, from the timing at which the laser beam L1 is detected by the sensor A, provided on the near side in the scanning direction, (rise of the detection signal of the sensor A), to the timing at which the laser beam L1 is detected by the sensor D, provided on the front side in the scanning direction, (rise of the detection signal of the sensor D), is measured (S2: refer to FIG. 7).

The time $T_\phi$ is a value corresponding to an interval between the sensors A and D at a predetermined scanning speed, and is ought to be measured as the same time also when only the laser beam L2 is activated to scan instead of the laser beam L1.

Functions of above S1 and S2 correspond to the same beam detection interval detection means of the present example.

Next, actually when the index signals S1 and S2 are generated, so that image recording is conducted, the activation of 2 semiconductor lasers 130A and 130B is controlled on the leading edge side of scanning (S4) so that only the laser beam L1 enters the sensor A, and only the laser beam L2 enters into the sensor D (S4). The function of S4 is equivalent to each-beam detection control means of the present example.

Concretely, when scanning is started, initially, only the laser beam L1 is activated to scan. Then, when the laser beam L1 is detected by the sensor A, the laser beam L1 is inactivated at once, and the laser beam L2 is activated to scan instead of the laser beam L1, and is detected by the sensor D. After the sensor D has detected the beam L2, both laser beams L1 and L2 are ready for activation and for image recording (refer to FIG. 7).

Incidentally, as described above, in the structure in which, when the laser beam L1 is detected by the sensor A, the laser beam L1 is inactivated at once, and the laser beam L2 is activated instead of the laser beam L1, the detection signal of the laser beam L2 is outputted from the sensor A in the case where the scanning point at the time of activation of the laser beam L2 exists on the sensor A. Accordingly, after the sensor A has detected the laser beam L1, it is preferable to stop the output of the sensor A (mask processing).

As described above, when the sensor A detects the laser beam L1, and the sensor D detects the laser beam L2, if the laser beams L1 and L2 do not deviate in the scanning direction, the time from the detection timing of the laser beam L1 by the sensor A to that of laser beam L2 by the sensor D, should be equal to the sensor interval time $T_\phi$. Accordingly, the difference with respect to the time $T_\phi$ directly corresponds to the deviation of the laser beams L1 and L2 in the scanning direction.

Herein, in the case where the detection signal obtained when the sensor A detects the laser beam L1, is delayed by the time $T_\phi$, the phase difference between the delayed detection signal and the detection signal obtained when the sensor D detects the laser beam L2, corresponds to the deviation of the laser beams L1 and L2 in the scanning direction, and apparently, is the same as the signal obtained by individually detecting the laser beams L1 and L2 at the same position in the scanning direction.

Then, the time $T_\phi$, previously obtained by activation and scanning of only the laser beam L1, is set as the delay time of the detection signal of the sensor A (S3), and the detection signal of the sensor A, (S5), obtained by individually detecting the laser beams L1 and L2 by the sensors A and D by selective activation on the leading end side of scanning, is delayed corresponding to the delay time $T_\phi$ (S6).

Then, the signal, in which the detection signal of the sensor A is delayed, is outputted as the index signal (synchronization signal) S1 (S7), and the detection signal of the sensor D (S8) is outputted as it is, as the index signal (synchronization signal) S2 of the laser beam L2 (S9). The above functions of S5 through S9 correspond to a synchronization signal output means of the present example.

The start of recording by the laser beam L1 and L2 is controlled according to the index signals S1 and s2, and actual image recording is conducted (S10).

When the system is structured so that the index signals S1 and S2 for laser beams L1 and L2 are generated as described above, even if deviations of laser beams L1 and L2 in the scanning direction are not constant, the index signals S1 and s2, which are highly accurately corresponding to the deviation at that time, can be generated, so that accurate recording start command can be outputted according to the index signals S1 and S2.

Further, by actually measuring the time $T_\phi$, the system can also correspond to the change of scanning speed of the laser beams L1 and L2.

Further, an example, in which accidentally the laser beam L1 scans at first and deviation is generated, is shown in FIG. 7, however, this relationship may be reversed. In this case, by delaying the detection signal of the sensor A by the time $T_\phi$, a signal, the rise of which is delayed from the detection signal of the sensor D, is obtained. Accordingly, without being thoughtful of the order of laser beams L1 and L2, the index signals S1 and S2 (synchronization signals) corresponding to the deviation in that case, are obtained by simple processing.

Incidentally, in the above example, the image forming apparatus using 2 laser beams L1 and L2, is shown, however, the apparatus, having the structure in which more than 3 laser beams simultaneously scan, may also be applied.

For example, in the case where 3 laser beams L1, L2 and L3 are used, a sensor, having 3 light receiving portions A, D, and E, each of which has a side perpendicular to the primary scanning direction, is prepared as an index sensor 140 according to the number of laser beams. Initially, only one laser beam is activated to scan, and the interval times $T_\phi 1$. and $T_\phi 2$ of the sensors A, D and E are detected.

Next, by respectively and selectively entering the laser beam L1 into the sensor A, the laser beam L2 into the sensor D, and the laser beam L, into the sensor E, detection signals are obtained from the sensors A, D and E.

In this case, the detection signal of the sensor A is delayed by $T_\phi 1$ and $T_\phi 2$, and the delayed signal is outputted as the index signal S1 for the laser beam L1. The detection signal of the sensor D is delayed by $T_\phi 2$, and the delayed signal is outputted as the index signal S2 for the laser beam L2. Further, the detection signal of the sensor E may be outputted as it is, as the index signal S3 for the laser beam L3.

That is, the interval time of the sensor is obtained by activation and scanning of the same laser beam, and then, the detection signal of the near side sensor may be delayed by the interval time so as to be in timed relationship with the detection timing of the first sensor in the scanning direction, after the detection signal from each sensor is outputted by individually entering the laser beam into each sensor.

Figure 8:
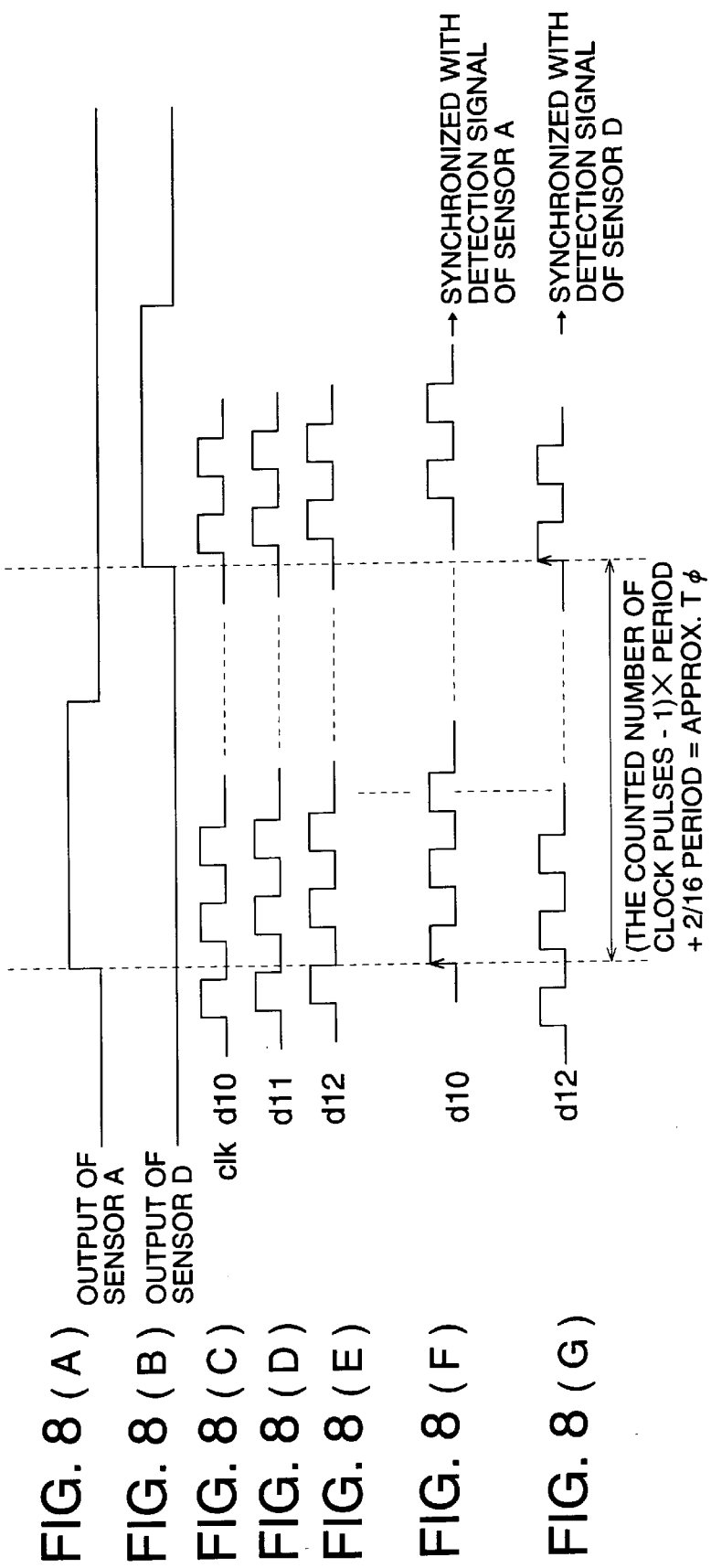
FIGS. 8(A) through 8(G) are time charts showing a measurement method of interval time of detection signals.

Herein, the difference of output time of the detection signals from the sensors A and D can be measured as shown in FIG. 8.

In FIG. 8, d10 is a reference clock clk, and clocks d11–d115, respectively having the phase difference of 1/16 period of the reference clock clk, are generated. Incidentally, in FIG. 8, only the clocks d10, d11, d12, d110, and d112 are shown, and other clocks are omitted in the drawing.

When the clock, synchronized with the rise of detection signal of the sensor A (the clock which rises first just after the rise of the detection signal), is assumed to be the clock d110, the rise of the clock d110 is counted following the above.

In this counting, the detection signal of the sensor D rises. When a clock synchronized with the rise of the detection signal is assumed to be the clock d112, the difference of the output time of the detection signals of the sensors A and D is a value, in which the phase difference between the clock d110 and the clock d112, is added to the time, obtained in such a manner that a value, obtained by subtracting by 1 from the counted number of the rise of the clock d110 up to that time (including the rise of the clock d110 synchronized with the detection signal of the sensor A), is multiplied by the clock period.

Figure 9:
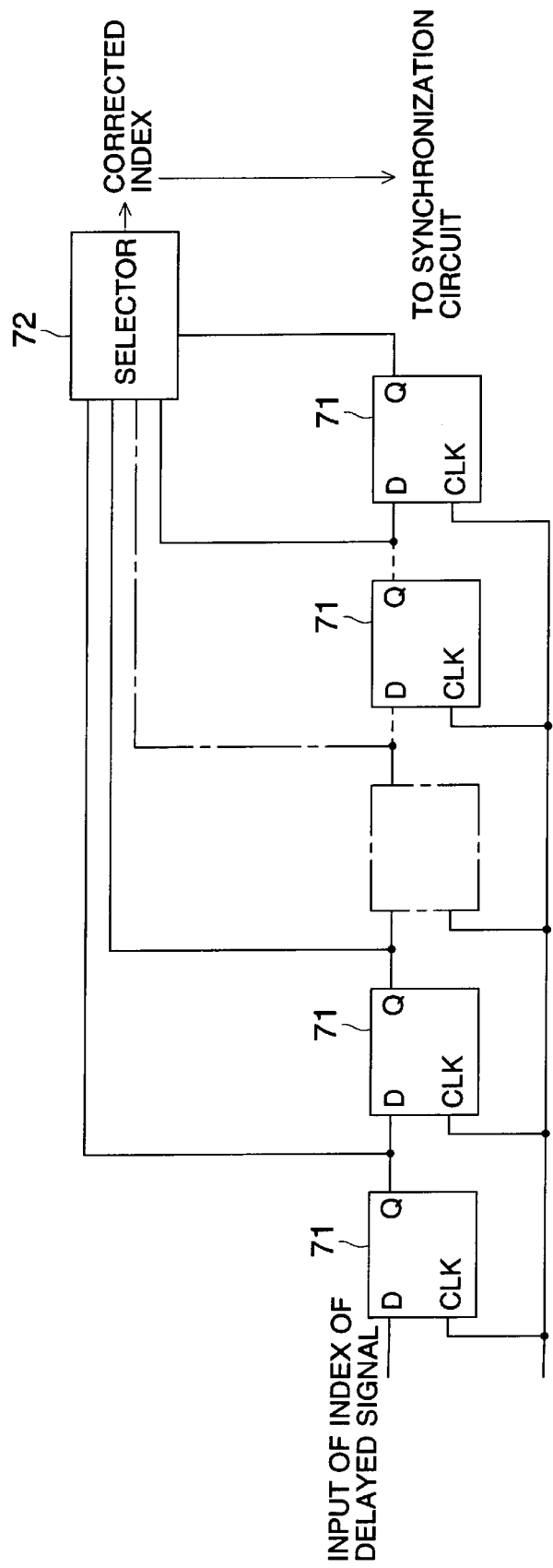
FIG. 9 is a circuit diagram showing an example of the structure to conduct delay processing of the detection signal.

Further, when the time is measured in the manner as described above, the detection signal of the sensor can be delayed by the circuit structure as sown by FIG. 9 using the result of the measurement.

In FIG. 9, a plurality of stages of shift registers 71 are provided by being serially connected, and the clocks d10–d115 are selectively inputted to each shift register 71. Further, all of a plurality of stages of shift outputs from the shift registers 71, are inputted into a selector 72, and any one of shift outputs is selectively outputted from the selector 72 as a delay signal.

Herein, in the manner as shown in FIG. 8, when the detection signal of the sensor A is delayed by the measured time, in the case where the rise of the detection signal of the sensor A is synchronized with the clock d110, and the rise of the detection signal of the sensor D is synchronized with the clock d112, the clock d112 is respectively supplied to each shift register 71 as a clock signal. That is, by inputting the clock d112 to each shift register 71, the shift registers 71 are operated by delaying fractions which can not be expressed by the clock period.

On the other hand, as an output of each shift register 71, a shifted signal corresponding to the number of count, obtained by subtracting by 1 from the number of count of the clock d110, may be selected in the selector 72 and outputted.

For example, when the number of count of the clock is 3, the output from the second stage shift register, which is delayed by 2 periods, may be selected in the selector 72.

Incidentally, in the above example, the index signals S1 and S2, having the phase difference consequently corresponding to the deviation of the laser beams L1 and L2 in the scanning direction, are obtained by delay-processing by the sensor interval time $T_\phi$. However, the system may be structured such that, actually, when the deviation time in the scanning direction between the laser beams L1 and L2 is calculated, and the detection signal is delayed according to the deviation time, the index signals S1 and S2 corresponding to laser beams L1 and L2 are obtained.

Figure 10:
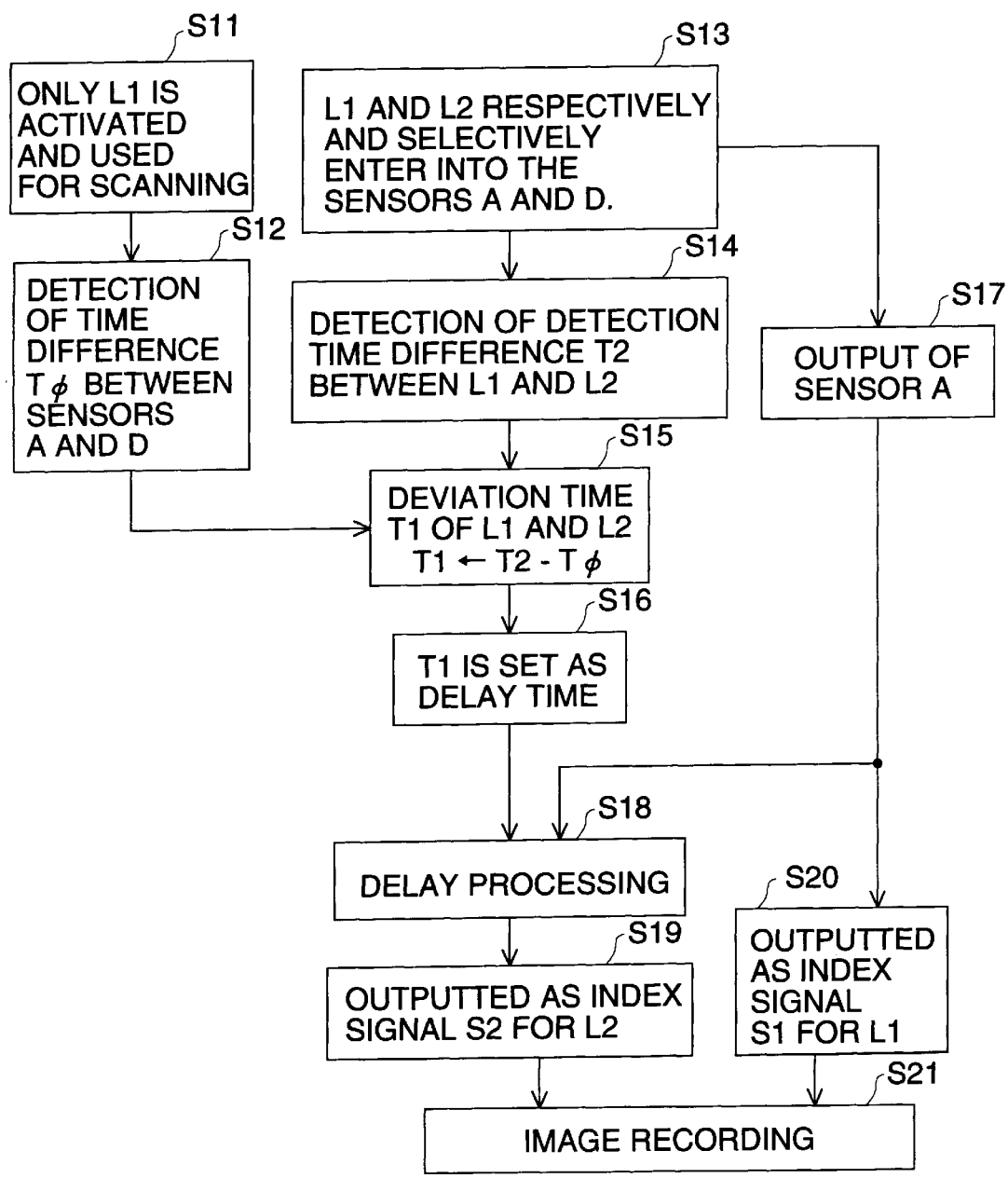
FIG. 10 is a flow chart showing the second example of synchronization signal generation control.

Such an example will be described according to the sequence shown in the flow chart in FIG. 10, and referring to a time chart shown in FIG. 11.

Initially, in the same manner as the above-described example, the interval time $T_\phi$ between the sensors A and D is measured by activation and scanning of only the laser beam L1 (S11, S12: the same beam detection-interval detection means).

Next, the laser beams L1 and L2 are selectively entered into the sensors A and D, and the detection signal of the laser beam L1 is obtained from the sensor A and the detection signal of the laser beam L2 is obtained from the sensor D (S13: each-beam detection control means). Further, the difference T2 of generation time of the detection signal at this time is measured (S14: each-beam detection interval detection means).

Figure 11:
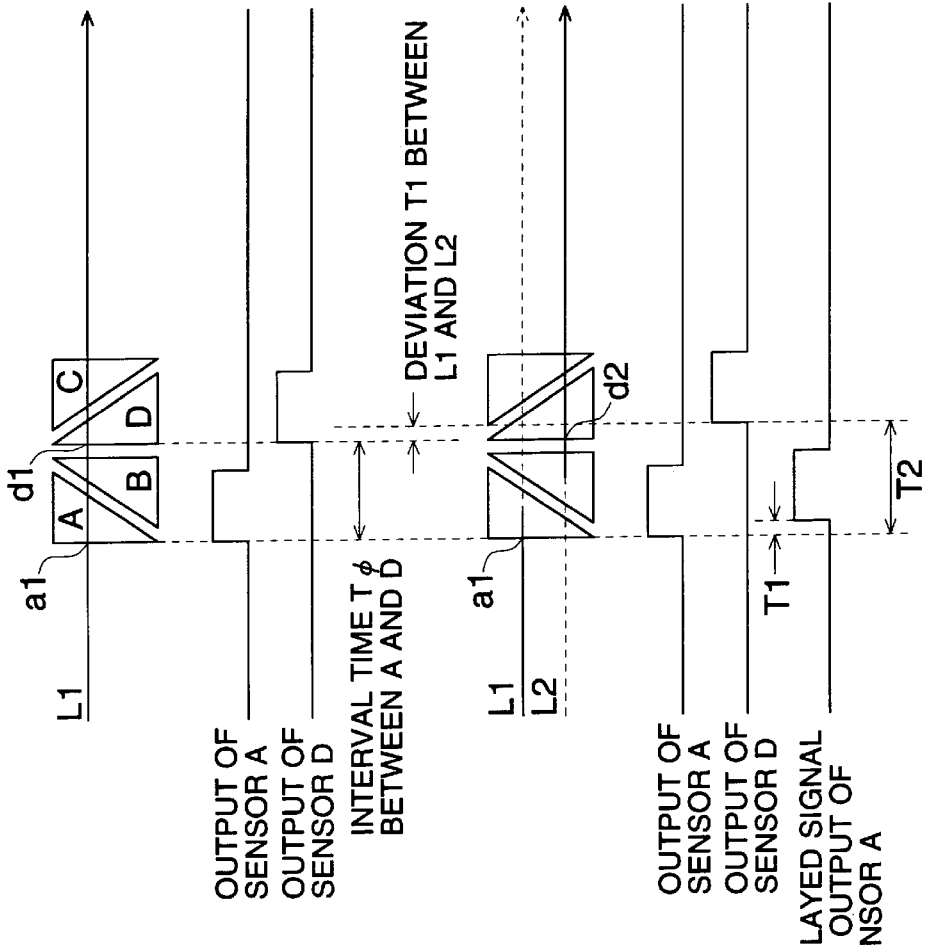
FIGS. 11(A) through 11(G) are time charts showing characteristics of synchronization signal generation in the second example.

Herein, when there is no deviation between the laser beams L1 and L2 in the scanning direction, $T_\phi$ and T2 ought to be the same, and the difference T1 between them (T2−$T_\phi$) is corresponding to the deviation between the laser beams L1 and L2 in the scanning direction, and is delayed toward the laser beam L2 side in FIG. 11, (S15: deviation time calculation means).

Therefore, the detection signal (S17) of the sensor A is outputted as it is, as the index signal S1 corresponding to the laser beam L1 (S20). A signal, in which the detection signal of the sensor A (S17) is delayed by the deviation time T1, is generated (S16, S18), and this delay signal is outputted as the index signal S2 corresponding to the laser beam L2 (S19). Functions of the above-described S16 through S20 correspond to a synchronization signal output means of the present example.

That is, the laser beam L2 scans being delayed by the time T1 with respect to the laser beam L1. The detection signal of the sensor A is outputted corresponding to the laser beam L1, and therefore, when the detection signal of the sensor A is delayed by the time T1, this delayed signal is outputted corresponding to the scanning position of the laser beam L2.

Then, the recording start position is controlled according to the index signals S1 and S2, and image recording is conducted by the laser beams L1 and L2 (S21).

In also the above-described example, actually, the deviation between the laser beams L1 and L2 in the scanning direction is determined, and delay processing is carried out corresponding to the deviation. Thereby, the index signals S1 and S2 are generated corresponding to the laser beams L1 and L2, and even if the deviation is not constant, highly accurate index signals S1 and S2 can be obtained.

However, when the system is structured such that, when the laser beam L2 scans first and the laser beam L1 subsequently scans, the laser beam L1 enters into the sensor A and the laser beam L2 enters the sensor D, then, the T1 is calculated as a negative value, and practically, the index signal S2 corresponding to the laser beam L2 can not be generated according to the detection signal of the sensor A.

Accordingly, when the time T1 is calculated as a negative value, the relationship of the laser beams L1 and 12 which are selectively entered the sensors A and D in the S13, is reversed, so that the laser beam, which scans first, is entered the sensor A, or the output of the sensor D by the laser beam L2 is used as a reference, and the output of the sensor D is the synchronization signal of the laser beam L2, and a signal in which the output of the sensor D is delayed by T1, is the synchronization signal of the laser beam L1. Such the function corresponds to a front beam setting means.

Incidentally, in also the structure in which the deviation time is actually calculated and delay processing is conducted in the manner as described above, the number of laser beams may be more than 3, which is the same as the first example.

In this connection, also when more than 3 laser beams are used, the laser beam which enters into the nearest sensor A in the scanning direction, is required to be the laser beam which scans first, however, the laser beams which enter into the sensor D and after sensors, are not necessarily in the order of scanning.

As described above, even in the case where actual deviation time is calculated and the detection signal is delay-processed, the delay processing can be carried out by the circuit as shown in FIG. 9.

For example, when one laser beam is used to determine the interval time $T_\phi$ between the sensors A and D, the clock d110 and the clock d112 are synchronized with respective detection signals, and the number of count of clocks (period) is assumed to be 10 as shown in FIG. 8. On the other hand, when the laser beams L1 and L2 selectively enter into the sensors A and D, the clock d110 and the clock d114 are synchronized with respective detection signals, and the number of count of clocks is assumed to be 12, as shown in FIG. 12.

Figure 12:
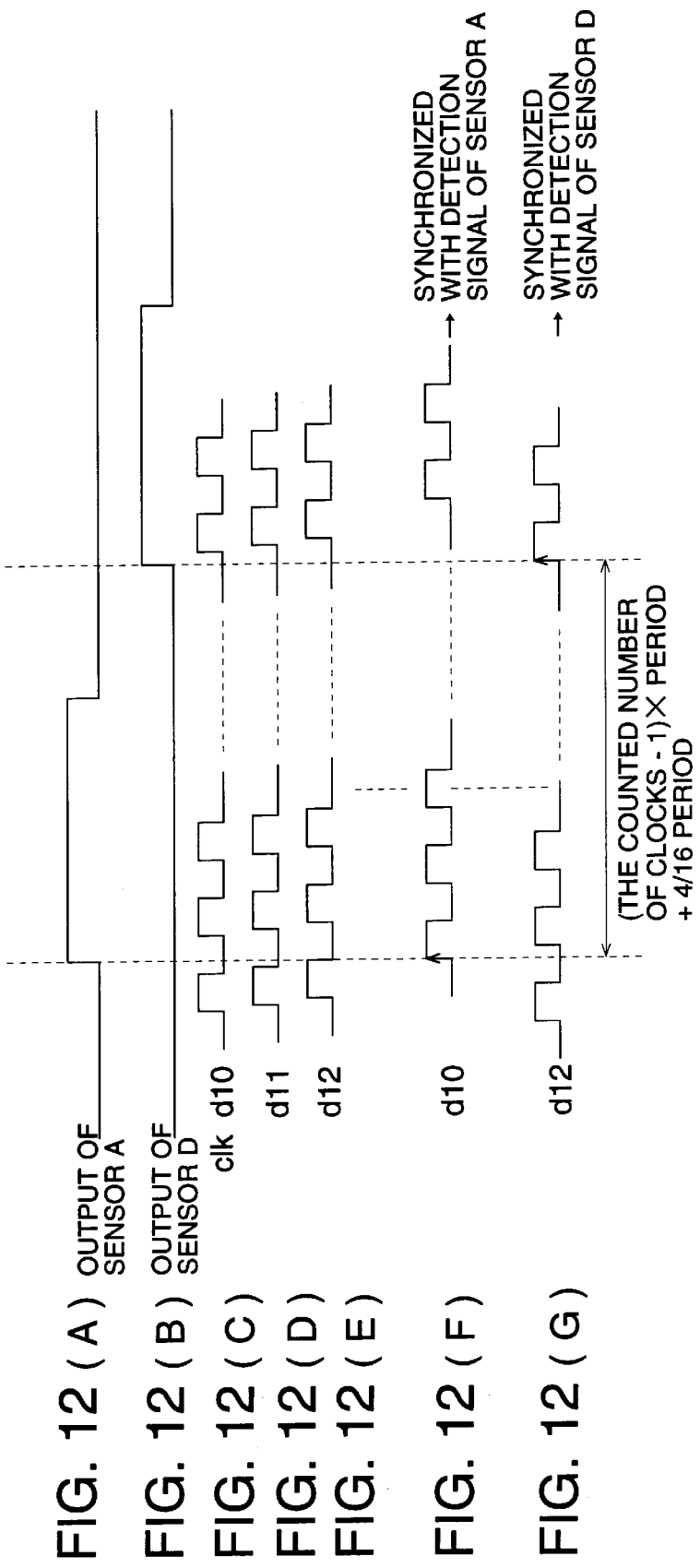
FIGS. 12(A) through 12(G) are time charts showing a method of measurement of interval time of the detection signal.

In this case, the time measured in FIG. 8 is (10+$\frac{2}{16}$)×period, and the time measured in FIG. 12 is (12+$\frac{4}{16}$)×period. Accordingly, the difference of the count value of the clock (period) is 2, and the difference of fraction which can not be expressed by the count value of the clock is $\frac{2}{16}$ period.

Accordingly, when the detection signal of the sensor A is delayed by the difference between the time T2 measured by the characteristics shown in FIG. 12, and the time $T_\phi$ measured by the characteristics shown in FIG. 8, the delay corresponding to the $\frac{2}{16}$ period is set by inputting the clock d110, which is delayed by 2 stages from the clock d110 with which the detection signal of the sensor A is synchronized, to the shift register 71. Further, the delay processing of 2 periods may be carried out by selecting and outputting the output signal, which is delayed by 2 periods, by the selector 72 as the output of the shift register 71.

Incidentally, in the above example, the index signals S1 and S2 (synchronization signals) corresponding to respective laser beams L1 and L2 are generated by delay processing the detection signals of the sensors A and D of the index sensor 140 in an index signal generation circuit 37. In the condition that only the laser beam L1 enters into the sensor A, and only the laser beam L2 enters into the sensor D, the index signals S1 and S2 which are synchronized with the detection signals of sensors A and D, are generated. On the other hand, data which is the same as delayed data of the detection signal in the above example, is inputted into a synchronization circuit 60, and the data clock (dot clock) DCK generated by the synchronization circuit 60, is delay-processed in a predetermined manner. The system may be structured such that the data clocks DCK corresponding to the relationship of the scanning positions of the laser beams L1 and L2, are generated thereby.

Figure 13:
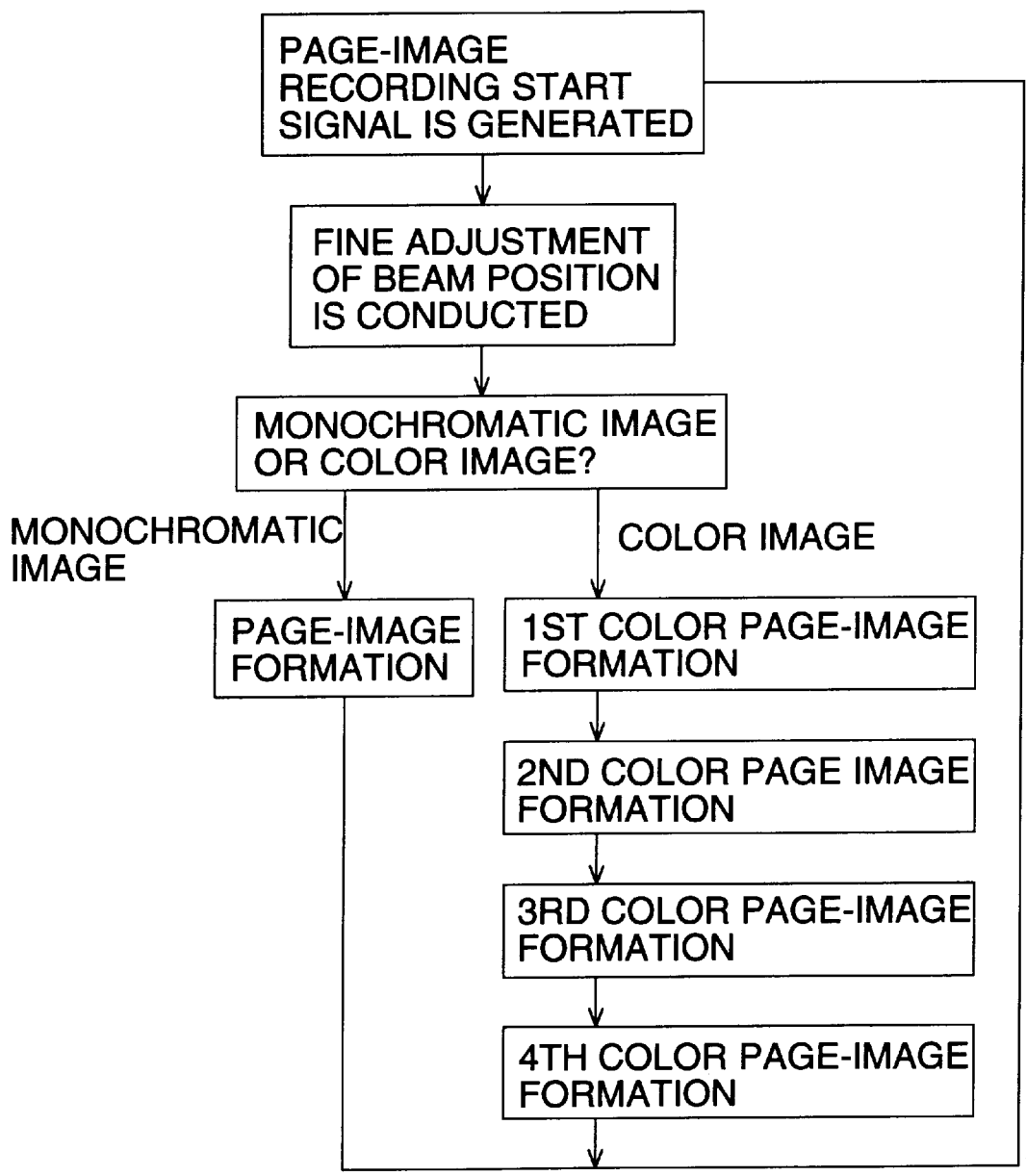
FIG. 13 is a flow chart showing processes of light beam fine adjustment in the primary scanning direction, by a plural beam optical scanning apparatus.

FIG. 13 is a flow chart showing processes of light beam position adjustment in the primary scanning direction by the control means of the image forming apparatus of the present invention. When an image recording start signal is generated, initially, fine adjustment is carried out to adjust beam positions of a plurality of laser beams to predetermined positions. After the fine adjustment has been completed, a page-image is formed when an image to be recorded is a monochromatic image. When a page-image to be recorded is a color image, the color image is formed by the image formation process as shown in FIG. 1. In this case, deviation correction is not conducted for each color, and relating to images from the first color to 4th color, the images are formed according to the fine adjustment which has been conducted before first color image formation. When there are plural pages of color images, the fine adjustment is conducted again for each page, and the image formation is conducted in the same process as described above.

The present invention can be applied to a apparatus system other than a color image forming apparatus shown in FIG. 1. That is, the present invention can be applied to either of following apparatus systems: a system in which a single color toner image is formed on the photoreceptor drum 10, and is successively transferred onto the image supporting body, (this system is called a successive transfer system, and is shown in FIG. 14); and a system in which, after a single color toner image has been developed on the photoreceptor drum 10 plural times, the images are collectively transferred onto a transfer sheet, (this system is called a collective transfer system).

Figure 14:
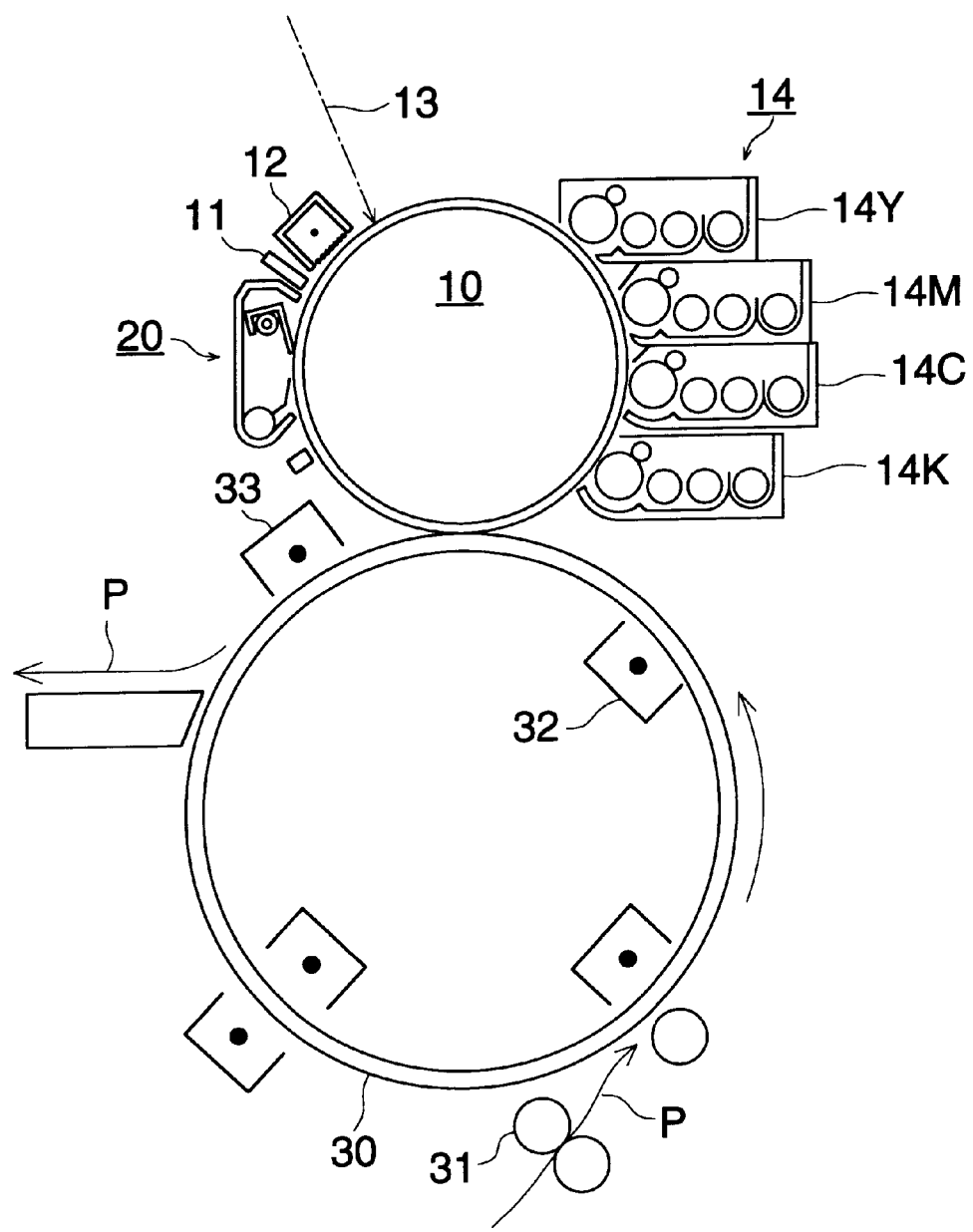
FIG. 14 is a view showing the structure of a successive transfer type color image forming apparatus.
Figure 15:
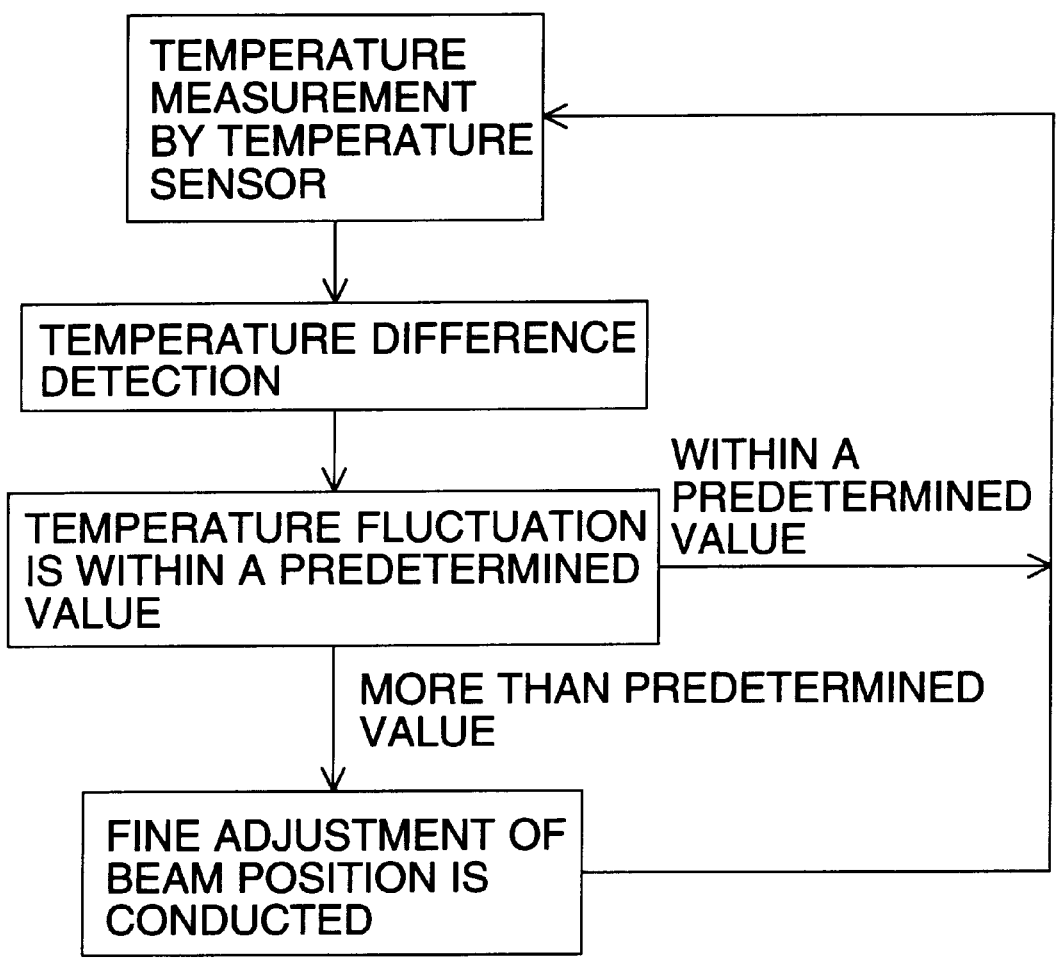
FIG. 15 is a flow chart showing a fine adjustment process by the conventional temperature measurement.

The image formation system by a successive transfer system color image forming apparatus as shown in FIG. 14 will be described below. A scorotron charger 12 which supplies electric charges on the surface of the photoreceptor drum 10 by corona discharge, an exposure optical system 13, a plurality of developing devices 14Y, 14M, 14C and 14K, in each of which a single color developer is stored, and a cleaning device 20 to clean residual toner on the photoreceptor drum 10, are arranged close to the peripheral surface of the photoreceptor drum 10 having a photoreceptor layer to form an electrostatic latent image, on a conductive base body. On the other hand, a conveyance unit 31 to supply a transfer sheet P to a transfer drum 30 is arranged on a transfer drum 30 side which is composed of a conductive base body, a conductive elastic body layer, and an insulation layer. The transfer sheet P supplied from the conveyance unit 31 is conveyed to a transfer section in which a transfer electrode 32 is arranged, and a toner image developed by different color toner on the photoreceptor drum 10, is transferred onto the transfer sheet P. A multi-color image is formed on the surface of the transfer sheet P by repeating this operation plural times, the transfer sheet P is sent to a separation section, and electric charges on the transfer drum 30 are removed by a separation electrode 33, and the transfer sheet P is separated from the transfer drum 30 and delivered. This transfer sheet P is fixed by a fuse and pressure type fixing device, and a multi-color image is formed.

As described above, according to the image forming apparatus of the present invention, fine adjustment of the scanning positions of a plurality of laser beams (light beams) is conducted before image formation, according to a page-image area signal showing an image formation area, and therefore, the scanning positions of the laser beams are finely adjusted for each image formation. That is, the fine adjustment function is operated before each image formation, in spite of detection of temperature variation, or the like. Thereby, scanning positions of a plurality of laser beams can be finely adjusted by a simple circuit structure, and an image can be formed on a constantly stable condition by the fine adjustment for each image formation.

What is claimed is:

1. An image forming apparatus for forming a multicolor image which comprises a plurality of different color images, the image forming apparatus comprising:
   (a) an image carrier;
   (b) a light beam exposing device for generating a plurality of light beams for simultaneously exposing for a same color image which is one of the plurality of different color images, wherein a plurality of scanning lines formed by the plurality of light beams on the image carrier are parallel to a primary scanning direction on the image carriers, and the light beam exposing device is operable to scan the image carrier once for each of the plurality of different color images;
   (c) a photosensitive sensor for detecting an amount of deviation of the plurality of light beams in the primary scanning direction with respect to a first color image of the plurality of different color images; and
   (d) a deviation correcting device for correcting deviations among the plurality of light beams in connection with scanning for each of the plurality of different color images according to the detected amount of deviation with respect to the first color image of the plurality of different color images.

2. The image forming apparatus of claim 1, further comprising:
   a plurality of developing devices provided around the image carrier for developing a latent image formed thereon into a developed image, said plurality of developing devices having respective different colored developers and being operated once for each of the plurality of different color images to thereby superimpose different colored toner images to form the multicolor image on the image carrier; and
   a transfer device provided around the image carrier for transferring the multicolor image from the image carrier onto a recording medium.

3. An image forming apparatus comprising:
   (a) an image carrier;
   (b) light beam exposing means for generating a plurality of light beams and simultaneously scanning the image carrier in a primary scanning direction along respective lines which are parallel to each other in a secondary scanning direction which is perpendicular to the primary scanning direction, said light beam exposing means being operated to perform an exposure operation with respect to at least a first color of a plurality of different colors;
   (c) a photosensitive sensor for detecting an amount of deviation of the plurality of light beams in the primary scanning direction with respect to the first color;
   (d) judging means for judging whether the image formed on the image carrier is a monochromatic image or a color image; and
   (e) deviation correcting means for: (i) correcting deviations among the plurality of light beams according to the detected amount of deviation before each exposure operation of the light beam exposing means when the judging means judges that the image formed on the image carrier is a monochromatic image, and (ii) correcting deviations among the plurality of light beams in connection with scanning for each of the plurality of colors according to the detected amount of deviation with respect to the first color of the plurality of colors when the judging means judges that the image formed on the image carrier is a color image.

4. An image forming apparatus comprising:

(a) an image carrier;

(b) light beam exposing means for generating a plurality of light beams and simultaneously exposing a same color image, wherein said plurality of light beams are parallel to a direction which is perpendicular to a primary scanning direction of the image carrier, and the light beam exposing device is operable to scan the image carrier once so as to perform an exposure operation with respect to at least a first color of a plurality of different colors;

(c) a photosensitive sensor for detecting an amount of deviation of the plurality of light beams in the primary scanning direction with respect to the first color;

(d) a judging device for judging whether the image formed on the image carrier is a monochromatic image or a multicolor image; and (e) a deviation correcting device for: (i) correcting deviations among the plurality of light beams according to the detected amount of deviation before each exposure operation of the light beam exposing means when the judging device judges that the image formed on the image carrier is a monochromatic image, and (ii) correcting deviations among the plurality of light beams in connection with scanning for each of the plurality of different colors according to the detected amount of deviation with respect to the first color of the plurality of different colors when the judging device judges that the image formed on the image carrier is a multicolor image.

* * * * *